3,021,288
MANUFACTURE OF ANION-EXCHANGE RESINS

Theodore Roger Ernest Kressman, Watford, England, assignor to The Permutit Company, Limited
No Drawing. Filed Apr. 8, 1960, Ser. No. 20,827
Claims priority, application Great Britain Apr. 15, 1959
7 Claims. (Cl. 260—2.1)

This invention relates to the manufacture of particles of anion-exchange resins by the haloalkylation of particles of a cross-linked synthetic aromatic polymer by treatment with one or more haloalkylating agents in the presence of a Friedel-Crafts catalyst to form an intermediate haloalkylated product, which is subsequently aminated to form the final resin. Such an aromatic polymer can be obtained in the form of particles either by polymerisation of the constituents in bulk or in solution and subsequent comminution to granules, or directly as beads or pearls by a suspension polymerisation technique. The cross-linking agent may be aromatic or aliphatic.

The haloalkylation is usually chlormethylation, and for the sake of simplicity the invention will be described in terms of chlormethylation.

The chlormethylating reaction is carried out in a non-aqueous liquid, which may be excess chlormethylating agent. The chlormethylating agent forms a complex with the Friedel-Crafts catalyst, and when the chlormethylation is complete the particles of the intermediate chlormethylated product are swollen with some of the chlormethylating agent, part or all of which is in the form of this complex, and with the liquid in which the reaction is carried out if this liquid is not the chlormethylating agent. The standard practice is to flood the swollen particles with water, with or without previous separation of the particles from the reaction liquid, and then to remove and wash them with water before aminating them. The complex is apparently decomposed at some stage in this process, as it cannot be observed in the final resin.

In this process it is usually very difficult or even impossible to avoid cracking and breaking of the particles, and especially the larger particles. Such cracked and broken particles are very prone to break down further when a column or bed of the resin is used in an ion-exchange process, and this leads to the formation of an excessive amount of fine material and consequent high back-pressure in the column. The cause of the cracking is unknown.

According to this invention I decompose all or substantially all the complex in the still-swollen intermediate product by the addition of a liquid organic complex-decomposing agent that is capable of diffusing into the swollen polymer. I find that by proceeding in this way the cracking of the resin particles during manufacture and their subsequent breakage in use can to a large extent be prevented.

Not every organic liquid possesses the necessary properties, but many of the class of liquids commonly called "organic solvents" do. Examples are methanol, ethanol (including the grade known as industrial methylated spirit), acetone, ethyl methyl ketone, dioxan, tetrahydrofuran, dimethyl formamide and cyclohexanone. It can readily be established whether a given liquid possesses the required characteristics by adding some of it to a sample of the chlormethylated intermediate product which has been separated from the reaction mixture while observing the sample under a microscope. If the liquid is suitable it will be seen to penetrate the particles, which will become progressively paler from the outside inwards. When the particles are in the form of beads the appearance is that of the pupil of an eye contracting.

It appears probable that the mechanism of the decomposition involves reaction between the complex-decomposing agent and the catalyst in the complex, and that there is of course a similar reaction with this catalyst in the complex present in the excess reaction mixture. However this may be, I much prefer to separate the particles from the excess reaction mixture before adding the complex-decomposing agent. If this is done, then only enough complex-decomposing liquid to cover the particles of the intermediate product need be used, but the amount does not appear to be particularly critical. If the excess reaction liquid is not removed, a much larger amount of decomposing agent may be required.

Sufficient time must be allowed for the penetration and destruction of the complex by the decomposing agent to be substantially complete, and this will vary with the nature of the liquid and the size of the particles being treated. Some of the solvents mentioned above, notably tetrahydrofuran and dimethyl formamide, are capable of rapidly penetrating the particles and destroying the complex within a matter of minutes, while others, e.g. acetone and methanol, appear to take somewhat longer, up to an hour or more generally being required, depending on the size of the particles and on the degree of cross-linking of the polymer. Cyclohexanone is exceedingly slow.

It is preferable, though by no means necessary, to carry out the treatment with the complex-decomposing agent in two or more stages, each successive batch of agent being decanted, drained or filtered off and replaced by a fresh batch.

At the end of the decomposition of the complex the reaction mixture may be strongly acidic and should then be removed from the polymer as otherwise it will neutralise and render ineffective the amine used subsequently.

In no circumstances should the intermediate product be brought into contact with water before the addition of the complex-decomposing agent.

The amination is carried out in the usual way, either in the presence of the same liquid as that used for the decomposition or after replacing it by another. If it is replaced, the particles are drained of the excess of the decomposing agent and a fresh liquid is added to swell the particles or maintain them swollen. I prefer, however, to use the decomposing agent also as a swelling agent in the amination, since a small amount of cracking may occur as a result of its replacement. This is particularly liable to occur when ethylene dichloride is used as the replacement solvent, but there is rather less danger in replacement by benzene.

The conditions to be used for the amination will depend upon the particular amine employed. If trimethylamine is used, as it commonly is, to produce a strong-base resin it can be added to the chlormethylated particles. This amine may be used in aqueous solution or as the anhydrous material, and no heating is generally required, the reaction going substantially to completion in the cold, say overnight. If triethylamine is used the water-free amine is most conveniently used and heating is generally necessary to complete the reaction in a reasonable time. Again, dimethylamine, which will give a weak-base resin, is most conveniently used as its aqueous solution while diethylamine is used as the anhydrous base.

After the amination has been carried out the excess amine has to be removed. This is best accomplished by neutralisation with acid, e.g. hydrochloric or sulphuric acid. Concentrated acid should not be used as this may lead to some cracking of the particles, and the most perfect product is obtained by the slow addition of dilute acid to the well-stirred particles.

Excess liquid is finally separated from the resin, which is then washed with water.

The advantage obtained by the invention is shown by the following examples, in which Example 1 is a typical process used hitherto for the manufacture of an anion-exchange resin and Example 2 is an example of the manufacture of the same resin according to the invention.

Example 1

A mixture of 98 gms. styrene and 2 gms. ethylene dimethacrylate was made and 1 gm. benzoyl peroxide was dissolved in it. The solution was poured into 300 cc. of water containing in solution 0.3 gm. polyvinyl alcohol and stirred mechanically to break up the hydrocarbon into globules between about 1 mm. and 0.4 mm. in diameter. The whole was heated to about 85° C. and held at that temperature for 2 hours. Then the temperature was raised to 100° C. for a further 3 hours. The globules had by that time polymerised and were hard spheres, which were separated from the water and dried at 100° C.

To this copolymer was added 220 cc. chlormethyl ether and the mixture was allowed to stand to 20 minutes, during which time the spheres swelled and imbibed practically the whole of the chlormethyl ether. 500 cc. ethylene dichloride were then added and the mixture was stirred mechanically while being kept at 18° C. by external cooling with cold water. 70 gms. powdered anhydrous aluminium chloride were then mixed with 100 cc. ethylene dichloride and the mixture added in successive small portions to the spheres suspended in the main body of the ethylene dichloride, which was continuously stirred both during the mixing and for a further two hours, during which time it was kept cool. The reaction mixture was then flooded with water and the solid spheres were removed and washed with water.

To the chlormethylated intermediate product so obtained was added 200 cc. benzene followed by 250 cc. 30% aqueous trimethylamine solution. The mixture was stirred mechanically for 6 hours and then allowed to stand overnight. It was filtered and the solid product was washed with dilute hydrochloric acid and then with water until neutral.

The small hard spheres comprising the product were seen under the microscope to be full of cracks, many of these being internal cracks which gave a "crazed" appearance. Others, particularly the larger spheres, were cracked so badly that they appeared to have been cut part way through with a knife. Several contained many of these large cracks.

Example 2

Example 1 was repeated to the stage at which the chlormethylation had been completed. However, instead of flooding the reaction mixture with water the solid beads forming the intermediate product were separated from the liquid and excess acetone was added to them, the whole being gently stirred for 1 hour. The solid was separated from the liquid by filtration and a further quantity of acetone added, again with gentle stirring for 1 hour. The excess acetone was decanted leaving a "mush" of beads and acetone to which 250 cc. 30% aqueous trimethylamine solution was added, the whole being stirred for 6 hours and then stood overnight as in Example 1. The solid was filtered off, and washed with dilute hydrochloric acid and then with water until neutral.

When viewed under the microscope the beads were found to be almost all perfect spheres. Only a very occasional cracked sphere was seen and this was invariably one of the largest spheres.

Example 3

Example 2 was repeated but the amination was carried out with 130 gm. triethylamine instead of trimethylamine, the beads and amine being heated under reflux to 60° C. for 8 hours. The same perfect spheres resulted.

Example 4

Examples 2 and 3 were repeated with methanol instead of acetone. They were also repeated with tetrahydrofuran and in this case the stirring was continued for 15 minutes only. Exactly the same result was obtained.

Example 5

Examples 2 and 3 were repeated yet again, but this time the excess decomposing agent was filtered from the beads and 200 cc. benzene added to them before adding the amine. Once more perfect spheres were obtained.

As an example of another haloalkylating agent, 1½ parts of bromomethyl ether may be used instead of each part of chlormethyl ether.

I claim:

1. In a process for the manufacture of particles of an anion-exchange resin by the haloalkylation of particles of a cross-linked synthetic aromatic polymer by treatment with at least one haloalkylating agent in the presence of a Friedel-Crafts catalyst to form a swollen intermediate haloalkylated product containing a complex formed from the Friedel-Crafts catalyst and the haloalkylating agent, and subsequent amination of the intermediate product to form the final resin, the improvement which comprises contacting a liquid organic complex-decomposing agent that is capable of diffusing into the swollen polymer with the still swollen intermediate haloalkylated product before it has been contacted with water until substantially all of the complex in such still swollen intermediate product has been decomposed.

2. A process according to claim 1 in which the haloalkylation is chloromethylation.

3. A process according to claim 1 in which the intermediate haloalkylated product is separated from the excess reaction liquid before the complex-decomposing agent is added.

4. A process according to claim 1 in which the complex-decomposing agent is selected from the group consisting of methanol, ethanol, acetone, ethyl methyl ketone, dioxan, tetrahydrofuran, dimethyl formamide and cyclohexanone.

5. A process according to claim 1 in which the treatment with the decomposing agent is carried out in a plurality of stages, each successive batch of agent being decanted off and replaced by a fresh batch.

6. A process according to claim 1 in which the amination is carried out in the presence of the liquid used as the complex-decomposing agent.

7. In a process for the manufacture of particles of an anion-exchange resin by the chloromethylation of particles of a cross-linked synthetic aromatic polymer by treatment with chloromethyl ether in the presence of a Friedel-Crafts catalyst to form a swollen intermediate chloromethylated product containing a complex formed from the Friedel-Crafts catalyst and the chloromethyl ether, and subsequent amination of the intermediate product to form the final resin, the improvement which comprises contacting a liquid organic complex-decomposing agent selected from the group consisting of methanol, ethanol, acetone, ethyl methyl ketone, dioxane, tetrahydrofuran, dimethyl formamide and cyclohexanone with the still swollen intermediate chloromethylated product before it has been contacted with water until substantially all of the complex in such still swollen intermediate product has been decomposed.

References Cited in the file of this patent

UNITED STATES PATENTS

| | | |
|---|---|---|
| 2,694,702 | Jones | Nov. 16, 1954 |
| 2,794,785 | D'Alelio | June 4, 1957 |